United States Patent [19]

Taylor et al.

[11] Patent Number: 5,456,295
[45] Date of Patent: Oct. 10, 1995

[54] VEHICLE TRANSMISSION OIL FILLING APPARATUS AND METHOD

[75] Inventors: Stephen J. Taylor, Lake Orion; Alla B. Miretsky, Southfield; Gerald R. Urick, Bloomfield Hills, all of Mich.

[73] Assignee: Chrysler Corporation, Highland Park, Mich.

[21] Appl. No.: 273,064

[22] Filed: Jul. 11, 1994

[51] Int. Cl.⁶ .................................................. B65B 31/00
[52] U.S. Cl. .............................. 141/5; 141/192; 141/198; 184/1.5
[58] Field of Search .................................. 141/4, 5, 7, 39, 141/40, 46, 98, 192, 198; 184/1.5, 103.1, 105.1

[56] References Cited

U.S. PATENT DOCUMENTS

| | | | |
|---|---|---|---|
| 2,937,449 | 5/1960 | Bade | 33/126.7 |
| 2,953,939 | 9/1960 | Rains | 74/606 |
| 3,802,596 | 4/1974 | Schmidt | 220/85 |
| 4,091,894 | 5/1978 | Lang | 184/105.1 |
| 4,274,549 | 6/1981 | Germain | 220/86 |
| 4,331,185 | 5/1982 | Rinaldo et al. | 141/95 |
| 4,806,902 | 2/1989 | Gana | 141/95 |
| 4,877,066 | 10/1989 | Okamizu | 141/198 |
| 5,062,447 | 11/1991 | Davison, Jr. et al. | 137/493 |
| 5,086,943 | 2/1992 | Poskie | 220/374 |
| 5,129,422 | 7/1992 | Davison, Jr. et al. | 137/599 |

*Primary Examiner*—Renee S. Luebke
*Assistant Examiner*—Timothy L. Maust
*Attorney, Agent, or Firm*—Christopher A. Taravella

[57] ABSTRACT

An improved vehicle transmission oil sump filling apparatus and method of using same, wherein the apparatus includes an integrally formed extension on the distal end of an otherwise conventional filler tube extending a predetermined distance into a transmission sump, and a sealed adapter assembly adaptable to being mounted in the entrance of the fill tube. The sealed adapter assembly includes a single short oil supply tube together with a pressurized air supply and sensing tube integrally formed therein. An air pump is operative for continually blowing air through the sensing tube while the transmission sump is being filled from a source of oil by a reversible oil pump. Once overfill of the sump is sensed, the overfill is drawn out under suction by the oil pump until reaching the point where air once again flows through the filler tube, indicating the appropriate sump oil level.

5 Claims, 2 Drawing Sheets

5,456,295

VEHICLE TRANSMISSION OIL FILLING APPARATUS AND METHOD

TECHNICAL FIELD

This invention relates generally to vehicle transmissions and, more particularly, to an adapter for initially filling the transmission sump with oil to a predetermined level.

BACKGROUND ART

Heretofore, along a vehicle assembly line, the initial oil supply has generally been added to the vehicle's transmission to an overfilled or an underfilled condition, and then corrected. The adapter assembly for accomplishing this operation includes long flexible filler and air pressure sensing tubes, as shown in FIG. 8.

DISCLOSURE OF THE INVENTION

A general object of the invention is to provide an improved transmission oil filling and sensing apparatus which facilitates the initial vehicle assembly line filling process.

Another object of the invention is to provide an improved vehicle transmission oil filling apparatus including an integrally formed extension on the end of an otherwise conventional filler tube extending a predetermined distance into a transmission, and a sealed adapter assembly adaptable to being mounted in the entrance of the fill tube and having a short air supply and air pressure sensing tube integrally formed therein for blowing pressurized air into the sump and detecting when the transmission sump is overfilled. The overfill is then sucked out until air is once again flows through the system, indicating the appropriate oil level.

These and other objects and advantages will become more apparent when reference is made to the following drawings and the accompanying description.

BEST MODE FOR CARRYING OUT THE INVENTION

Figure 1:
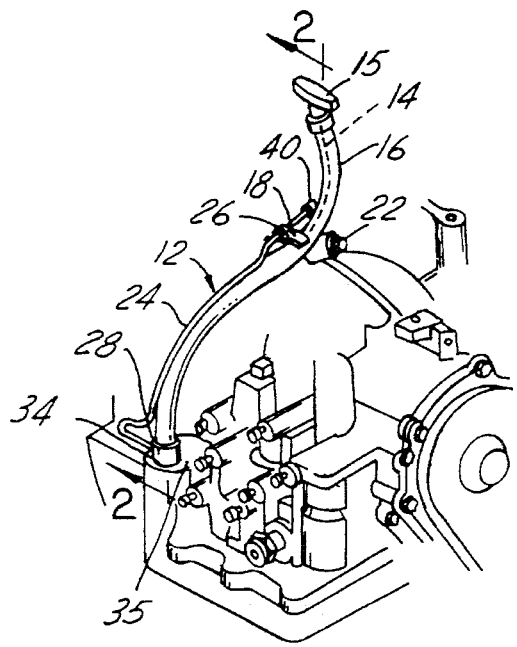
FIG. 1 is a perspective view of a vehicle transmission and an associated oil fill tube and air vent tube.

Referring now to the drawings in greater detail, FIG. 1 illustrates a vehicle transmission 10, having a sump 11 into which oil is added via a fill pipe assembly 12, after which a flexible dip stick 14 with a handle 15 is slip-fitted thereon. The fill pipe assembly 12 includes an S-shaped fill tube 16, configured as required to mount around other engine compartment parts positioned between the transmission 10 and the fill location. A support bracket 18 is secured on a predetermined section of the tube 16. An opening is formed adjacent the distal end of the bracket for receiving a suitable fastener, represented as 22 (FIG. 1), for fastening to a convenient fixed structure, represented as 23. A transmission vent tube 24, secured adjacent one end thereof by a clip 26 formed out of the bracket 18, extends into an inlet 28 formed on mounting flange 30 adjacent a lower mounting portion 32 (FIG. 2) of the fill tube 16, to communicate with the sump 11 of the transmission 10. The lower mounting portion 32 is anchored in an inlet opening or through-bore 34 formed in a transmission housing wall 35. A half-round or D-shaped extension tube 36 (FIGS. 2–4 and 6) extends from the lower end of the mounting portion 32 a predetermined further distance into the transmission sump 11. An opening 38 (FIG. 6) of an air passage 39 is formed in the exit of the mounting portion adjacent the upper end of the lower mounting portion 32, communicating between the transmission sump 11 and the inlet 38 to the vent tube 24.

A typical vented end cap 40 (FIGS. 1 and 2) is mounted on the outer end of the vent tube 24.

Figure 2:
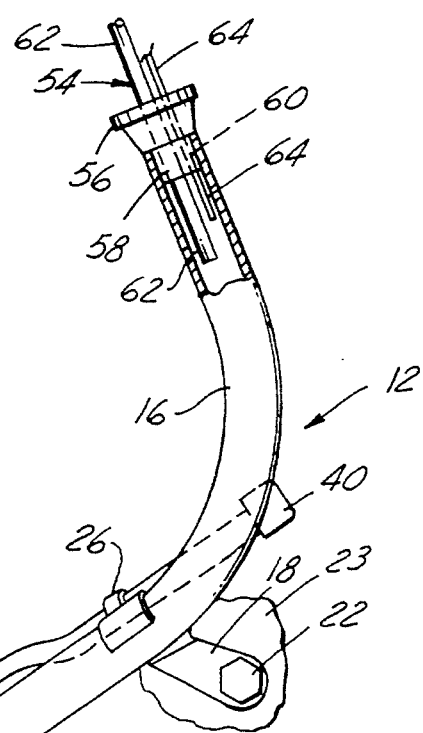
FIG. 2 is an enlarged side elevational view of a transmission fill tube, and its operational relationship to the transmission.
Figure 2:
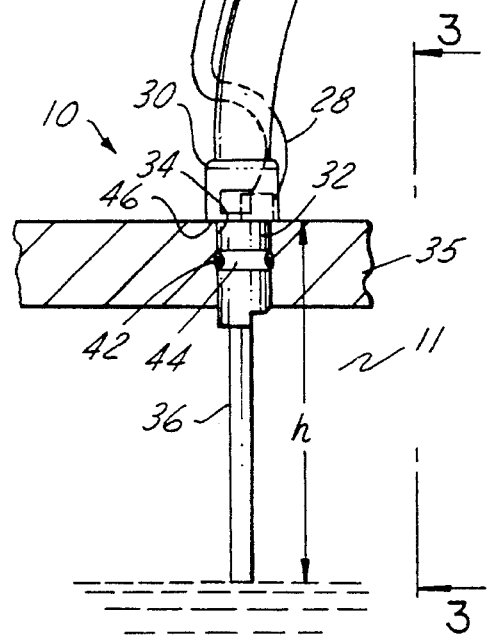
Figure 3:
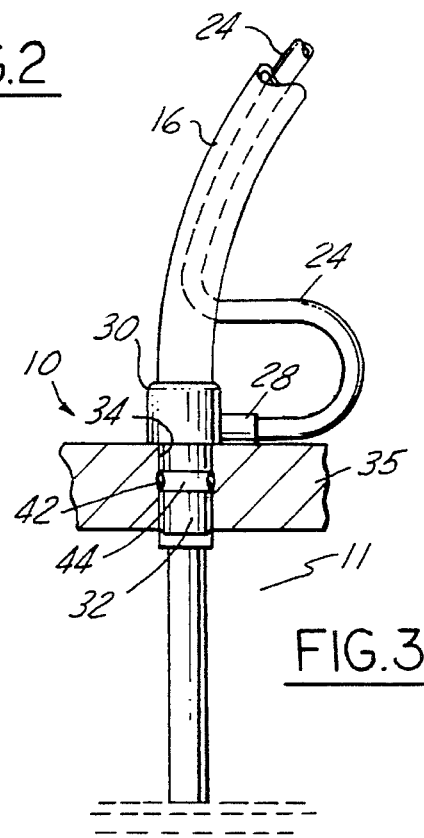
FIG. 3 is a fragmentary end view taken along the plane of the line 3—3 of FIG. 2, and looking in the direction of the arrows.

An O-ring seal 42 (FIGS. 2 and 3) is mounted in an annular groove 44 formed in the end portion 32 to prevent leakage therepast out of the transmission 10. An air gap height h is shown in FIG. 2 extending from a stop shoulder 46 of the mounting flange 30 to the terminal end of the D-shaped extension tube 36, for a purpose to be described.

Figure 4:
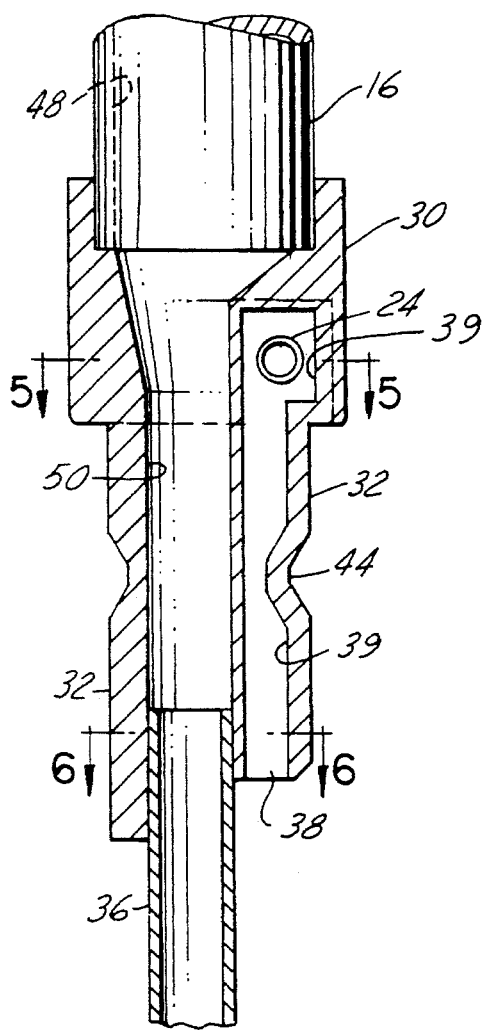
FIG. 4 is an enlarged fragmentary cross-sectional view taken along the plane of the line 4—4 of FIG. 3, and looking in the direction of the arrows.
Figure 5:
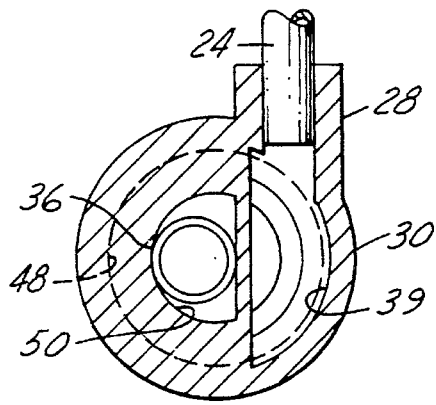
FIGS. 5 and 6 are cross-sectional views taken along the respective planes of the lines 5—5 and 6—6 of FIG. 4, and looking in the respective directions of the arrows.
Figure 6:
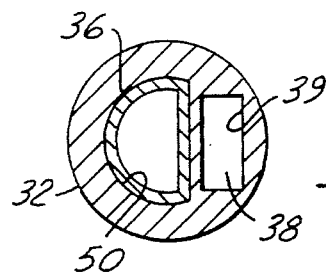

As shown in FIGS. 4–6, a circular fill passage 48 through the fill tube 16 blends into a D-shaped passage 50 through the mounting flange 30 and mounting portion 32. The air passage 39 is formed along side the D-shaped passage 50 through the mounting flange 30 and mounting portion 32 between the vent tube 24 and the exit opening 38.

Figure 7:
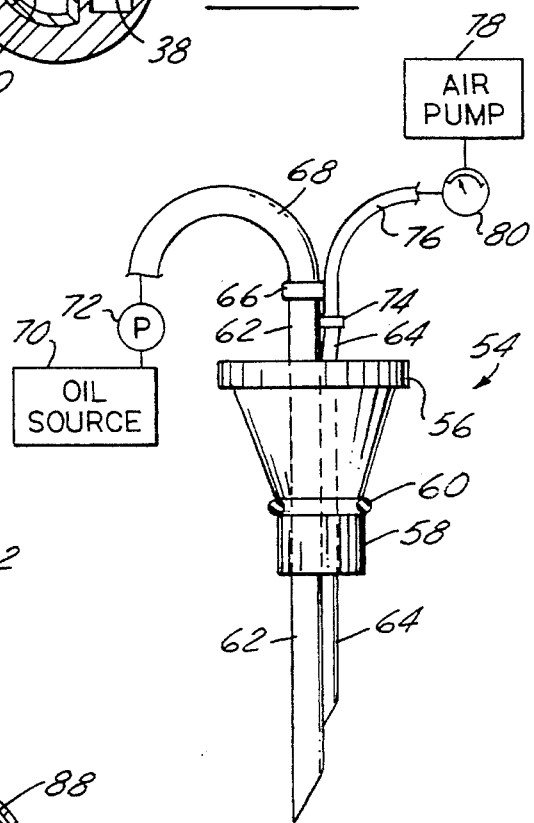
FIG. 7 is an enlarged view of the adapter assembly of FIG. 2.

As shown in FIG. 7, a vehicle assembly line transmission oil filling and checking adapter assembly 54 includes a frustoconical stop flange 56 and a disc 58 with a peripheral O-ring seal 60 therearound, and having a short rigid oil supply tube 62 together with a short pressurized air supply and oil level sensing tube 64 integrally mounted therethrough. The supply tube 62 is connected at its outer end by a suitable connector 66 to a hose 68 extending from a source of oil 70, with a reversible oil pump 72 operatively connected therein. The sensing tube 64 is connected at its outer end by a suitable connector 74 to a hose 76 extending from a source of pressurized air supplied by an air pump 78, with an air pressure gauge 80 operatively connected to the hose 76.

Figure 8:
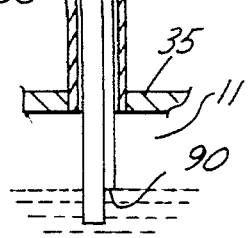
FIG. 8 is a view similar to FIG. 7 illustrating the prior art adapter assembly.

As shown in FIG. 8, a prior art assembly line filling and checking adapter assembly 82 includes a stop flange 84 fixed on the upper end of a rigid S-shaped fill tube 85. A long flexible supply tube 86, together with an air pressure sensing tube 88, are inserted in the upper end of the fill tube 85 and fed through the S-shaped fill tube 85, into the transmission sump 11. The tubes 86 and 88 are secured at adjacent sides thereof. The lower end 90 of the sensing tube 88 is used to detect the overflow of oil pumped into the transmission sump through the fill tube 86. Once pressurized air is unable to enter the sump by being blown through the sensing tube 88, an overfill condition is sensed. The overfill oil is then sucked back out through the fill tube 86 until air is once again sensed, whereupon the evacuation of oil stops, leaving the appropriate oil level.

During the initial transmission filling operation along the assembly line, the disc 58 and seal 60 of the adapter assembly 54 are placed in the upper opening of the S-shaped fill tube 16, with the stop flange 56 abutted against the top edge of the fill tube 16. The initial volume of oil is pumped from the source 70 by the oil pump 72 through the supply tube 62, the fill tube 16, and the extension tube 36 until the air gap "h" is passed, as evidenced through the air supply/pressure sensing tube 64. The overfill is then drawn out through the filler tube 62 by suction, resulting from a reversal of the oil pump 72, until air pressure in the sump at the end of the extension tube 36, sensed through the sensing tube 64 and indicated on the gauge 80, has again been reached.

The adapter assembly device 54 is then removed, and the conventional dip stick 14 is inserted in the fill tube 16, ready for future checking of the transmission oil level by a consumer. The transmission involved is ready for shipment with the vehicle for purchase by the consumer.

INDUSTRIAL APPLICABILITY

It should be apparent that, with the addition of the extension tube 36 and the vent tube 24, the assembly line problems with underfill and overfill encountered with the prior adapter (FIG. 8) are eliminated. Specifically, short rigid supply/pressure sensing tubes, wherein length is unimportant, mounted through a sealed disc, are used in lieu of long flexible supply/pressure sensing tubes, wherein length is crucial, and which must be fed completely through the full length of the permanent S-shaped fill tube. The latter arrangement results in additional time and labor required on the assembly line for feeding the tubes into and removing same from the transmission, with oil dripping from the filler tube upon removal from the permanent fill tube.

While but one embodiment of the invention has been shown and described, other modifications thereof are possible within the scope of the following claims.

What is claimed is:

1. For use with a vehicle transmission having a housing defining a sump, a fill tube and a vent tube communicating with the sump, wherein an initial volume of oil is pumped through the fill tube into the sump to a predetermined level, and an adapter assembly for supplying the initial volume of oil in the sump, said adapter assembly comprising an extension tube, formed on the exit end of the fill tube, and extending a predetermined length into the transmission sump, a disc having a peripheral seal adapted to being pressed into the entrance of the fill tube, a short oil supply tube, and a pressurized air supply and sensing tube mounted through the disc, communicating with an upper portion of said fill tube.

2. The adapter assembly described in claim 1, wherein said oil supply tube and said sensing tube are rigid, and said peripheral seal is an O-ring seal.

3. The adapter assembly described in claim 1, and a source of oil and a reversible oil pump for pumping oil from said source into said supply tube and, thence, through said fill tube into said transmission sump; and a source of air under pressure communicating with said sensing tube for blowing air through said fill tube and vent tube until oil passes the distal end of said extension tube to an overfill condition, whereupon said oil pump sucks out the overfill.

4. A method for supplying an initial volume of oil through a fill tube into a vehicle transmission sump to a predetermined level, with a vent tube communicating with the transmission sump, said method including the following steps:

a. forming the fill tube with an extension tube of a predetermined length integrally formed on one end thereof for extension into the transmission sump;

b. mounting the fill tube in an opening in a transmission housing;

c. inserting an adapter assembly into an inlet end of the mounted fill tube, wherein the adapter assembly includes a short oil supply tube and a short pressurized air supply and sensing tube;

d. passing oil from a source of oil through the short oil supply tube, the fill tube and the extension tube, while blowing air from a source of air through the sensing tube, until air flow is blocked by the oil having filled the sump past a distal end of the extension tube; and e. drawing out overfilled oil by suction through the extension tube, fill tube, and short oil supply tube until air is once again free to flow through the sensing tube, the transmission housing sump, and the vent tube.

5. The method described in claim 4, wherein steps d and e are accomplished by activation of a reversible oil pump.

* * * * *